United States Patent [19]

Apolant

[11] 3,735,276

[45] May 22, 1973

[54] OSCILLATOR SYSTEM

[75] Inventor: Richard Apolant, Irondequoit, N.Y.

[73] Assignee: S.C.J. Associates Inc., Rochester, N.Y.

[22] Filed: Apr. 12, 1972

[21] Appl. No.: 243,318

[52] U.S. Cl. ....................331/11, 331/15, 331/109, 331/113 R, 331/177 R

[51] Int. Cl. ....................H03b 3/02

[58] Field of Search....................331/15, 11, 109, 331/113, 177

[56] References Cited

UNITED STATES PATENTS 2,811,642 10/1957 Gabor ....................331/15

*Primary Examiner*—John Kominski

*Attorney*—Martin LuKacher

[57] ABSTRACT

A current controlled oscillator system is described which is isolated electrically from external systems and sources. The system includes a voltage controlled oscillator to which a control voltage related to the input control current is supplied for varying its frequency. A pair of alternating current channels respond to the oscillator signals and produce control signals which preset the frequency limits over which the oscillator frequency may be varied and to control the oscillator frequency so as to vary linearly with the input control current within such limits. The channels separately have a peak detector and a discriminator which develop control signals of opposite polarity from limited oscillator output signals. Isolation is provided both from control devices and from external power supplies by coupling these devices and power supplies to the system through transformers; the external power supply being coupled through a transformer which is part of a DC to AC inverter connected to the external supply.

10 Claims, 3 Drawing Figures

Patented May 22, 1973 3,735,276

OSCILLATOR SYSTEM

The present invention relates to a system for providing an output signal having a frequency related to the amplitude of an input signal and particularly to a current controlled oscillator system.

The invention is especially suitable for use in any system wherein a DC signal is to be accurately converted into an AC signal having a frequency linearly related to the amplitude of the DC signal. Applications of the system may be found in telemetry or signalling, for example where DC signals can not be accommodated over the communication link (viz., a telephone line). Other applications of the system may be found in test instruments and modulators.

Oftentimes it is desirable for a system to be isolated from external electrical apparatus and, for example, to have an internal ground which is isolated from an external ground (viz., an earth ground). Such isolation ensures that external signals do not enter and perturb the operation of the system. Isolation may be provided, but only as a matter of degree by operating the system at significantly high signal levels as compared to the levels of perturbing signals which may be anticipated.

Inasmuch as components which are available at reasonable cost are designed to operate at low signal levels, high level techniques engender many design difficulties. Inasmuch as most systems must make use of existing power sources which have external grounds, isolation from such grounds and also from control devices which may be so constructed as to be externally grounded presents additional problems. Leakage currents and other perturbing signals can be introduced into the system through the external ground particularly when internal grounds and the external grounds have common connections.

A particularly difficult problem in electronic system design is the design of a device analogous to a direct current transformer, especially when the output signal is to be directly proportional to the magnitude of the input direct current. Environmental effects such as temperature variations and aging of components introduce still further difficulties to the problem.

It is an object of this invention to provide an electronic system which produces a frequency related to the amplitude of an input direct current signal thus affording a solution to the aforementioned direct current transformer design problem, and which also affords isolation of the system from external systems, including external grounds.

An object of the invention is also to provide an improved system which provides an output signal having a frequency related to the amplitude of an input signal.

It is another object of the invention to provide an improved system for translating a direct current signal into an alternating current output signal wherein the frequency of the alternating current output signal is linearly related to the amplitude of the direct current signal over a range of input amplitude.

It is a further object of the present invention to provide an improved current controlled oscillator having an output frequency which is a function of input signal amplitude.

It is a still further object of the present invention to provide an improved current controlled oscillator, the output of which is completely isolated from both its input and from any external ground.

Briefly described an oscillator system in accordance with the invention includes a variable frequency oscillator. The output frequency of the oscillator is controlled in accordance with the amplitude of a direct current input signal. A linear relationship between the amplitude of the direct current input signal and the oscillator output frequency is obtained by a feedback arrangement including a pair of alternating current channels responsive to the signal produced by the oscillator. These channels develop first and second signals of opposite polarity, one of which varies in amplitude in accordance with the frequency of the oscillator signal, and the other which is of a certain constant amplitude to determine the limits of the range of frequency over which the system operates. To derive these signals a limiter may be connected between the oscillator and the channels. Preferably the limiter is a diode bridge having a zener diode connected across a diagonal thereof for establishing the limiting level. One of the channels may include a peak detector connected across one side of the bridge and the other a frequency discriminator connected across a diagonal of the bridge other than diagonal across which the zener diode is connected. Thus, the constant amplitude signal and the signal which varies with frequency are obtained from the same source. The discriminator and detector may include diodes polarized to develop the voltages of opposite polarity which may be combined with the input signals so as to control the frequency of the oscillator, both at its limits and throughout its operating frequency range.

Control devices such as potentiometers which may be connected to external grounds are coupled to the channels through isolating transformers. Thus the control devices are isolated from the system. A source of operating potential is also transformer-coupled through an isolation transformer to the system. The source is connected to a direct current to alternating current converter which uses the primary winding of the transformer. A rectifier connected to the secondary of the transformer provides direct current operating potential for the system. Thus the system is isolated from external sources which may have external grounds.

The invention itself both as to its organization and method of operation as well as additional objects, features, and advantages thereof will become more readily apparent from a reading of the following description when taken in connection with the accompanying drawings in which.

Figures 1, 2, 3:
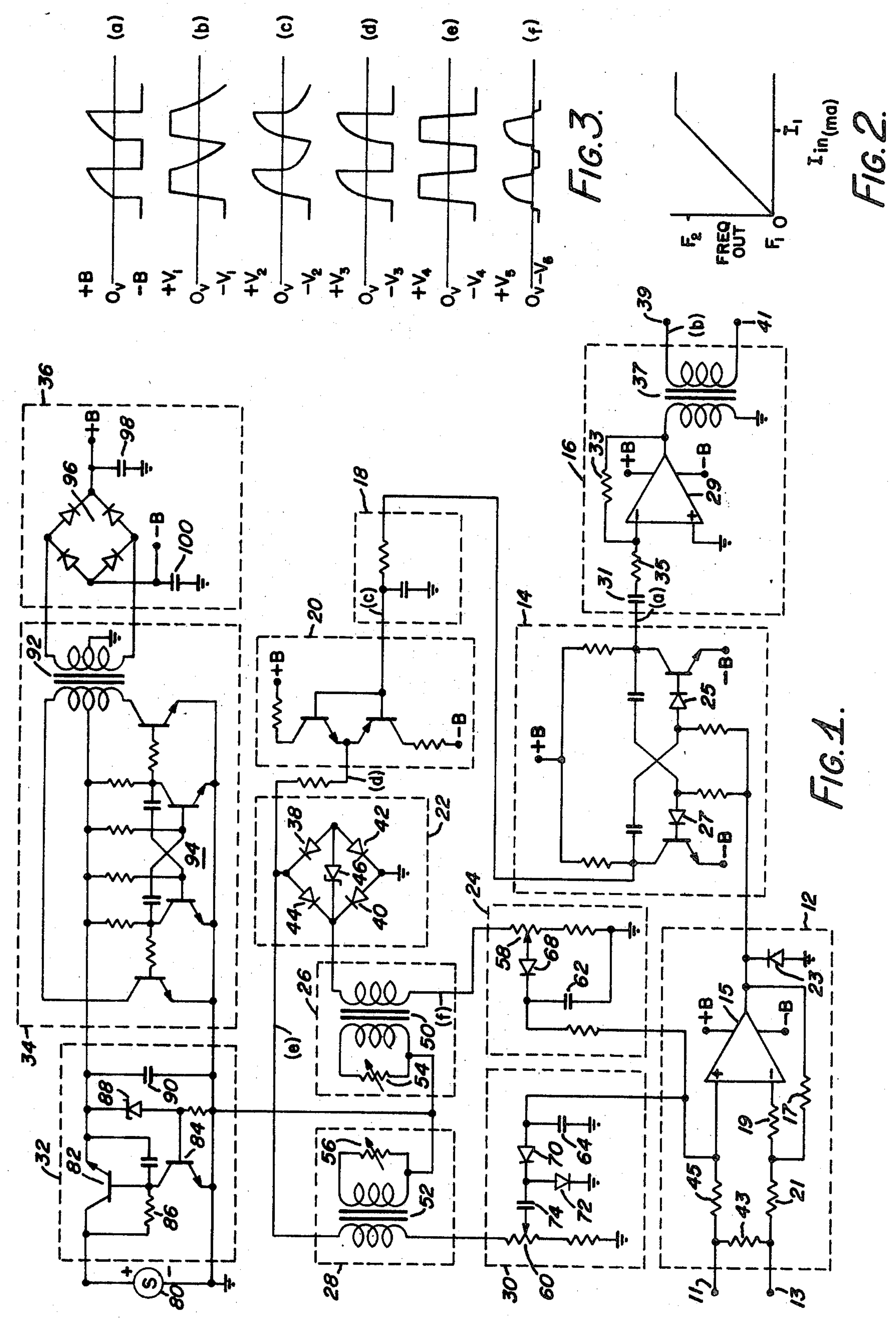
FIG. 1 is a schematic diagram of an oscillator system which is provided in accordance with the invention.
FIG. 2 is a curve showing the control characteristic of the system shown in FIG. 1.
FIG. 3 are a group of wave forms produced by the system of FIG. 1 during the operation thereof.

Referring more particularly to the drawings, the direct current input signal to the system may be connected across a pair of input terminals 11 and 13. The direct current input signal source may, for example, be a battery and a variable resistor connected in series with each other between the terminals 11 and 13. This direct current is then applied as one input signal to a control amplifier 12.

The control amplifier includes an operational amplifier 15 which receives operating voltage from the AC to DC converter 36 which provides isolation from external grounds and other electrical systems as will be discussed more fully hereinafter. The operating voltages, indicated at +B and −B are connected to correspondingly labeled terminals in the converter 36. The gain of the linear amplifier 15 is determined by the network which is connected between the output of the amplifier 15 and the inverting (negative or minus) input thereof. This network includes resistors 17, 19 and 21. A diode 23 which is connected across the output of the amplifier 15 shunts negative voltage to ground. Positive control voltage is applied to a voltage controlled oscillator 14.

This oscillator is a voltage controlled multivibrator of conventional design and includes diodes 25 and 27 which provide protection to the base emitter paths of the transistors in the multivibrator 14. Operating voltages from the multivibrator are applied at terminals labeled +B and −B from the converter 36. Outputs from the oscillator are available at the collectors of the transistors. One of these outputs is illustrated in waveform (*a*) and is connected to an output amplifier circuit 16. This output amplifier includes a feedback controlled operational amplifier 29 which is coupled to the multivibrator by way of a DC blocking capacitor 31. The gain of the amplifier is determined by both the feedback control resistor 33 and a resistor 35 connected to the negative or inverting input of the amplifier 29. Isolation of the system from any output is obtained by an output isolating transformer 37.

The output terminals 39 and 41 may be connected to the utilization system (e.g., a communicational link) when the system is used for signalling. The output signal may be a low-level (e.g., plus or minus one volt signal) the frequency of which carries the intelligence being transmitted. Such a signal is illustrated in FIG. 3 waveform (*b*) where $V_1$ is one volt. This output signal is of course an alternating current signal.

Inasmuch as a linear relationship between the input current and the output frequency, as illustrated in the system characteristics shown in FIG. 2 is desired, both presetting of the limits of the frequency range and control over the range is afforded by the systems provided in accordance with the invention. Note that the frequency of $F_1$ is desired when the input current amplitude is zero milliamps. When the input current amplitude is $I_1$ the output frequency is desired to be $F_2$. Between and over the range from $F_1$ to $F_2$, the output frequency varies linearly with input current. To this end a feedback arrangement is provided between an output from the oscillator 14 and the direct input of the operational amplifier 15 in the control amplifier 12. The oscillator output signals are first passed through a lowpass filter 18 which is provided for the principal purpose of smoothing the oscillator output as is illustrated by the waveform of the filter output (see waveform (*c*) of FIG. 3). The cut-off frequency of this filter may be above the upper frequency $F_2$ of the frequency output range $F_1$ to $F_2$.

The filtered oscillator output is then fed to a buffer amplifier 20 which is a complementary symmetry amplifier of conventional design. Like the other elements of the system, this amplifier receives operating voltage at its terminals indicated at +B and −B from the converter 36.

The output of the buffer amplifier is resistor-coupled to a limiter 22. This limiter is a diode bridge rectifier or rectifier bridge having four sides each including a separate diode 38, 40, 42 and 44. A diagonal of the bridge is presented between the junction of the diodes 38 and 44 and system ground. A zener diode 46 is connected across the other diagonal of the bridge. The zener diode 46 establishes the limiting level which is indicated at waveform (d) of FIG. 3 to vary from $+V_3$ to $-V_3$. The zener breakdown voltage is selected to be $V_4$. Inasmuch as both positive and negative voltages from the buffer amplifier output appear across the zener diode 46, it limits both positive and negative peaks of this output voltage to the zener breakdown potential plus the voltage drops across two of the diodes in the forward direction. The zener diode may also be temperature compensated thereby providing control against temperature effects in the diodes of the bridge as well as in other components of the circuit (e.g., the transistors in the buffer amplifier 20).

The feedback arrangement includes two A.C. channels, both of which use limited signals provided by the bridge limiter 22. The channel which controls the slope of the system characteristic and provides the linear relation (see FIG. 2) uses the limited A.C. voltage across the diagonal of the bridge which is connected between the junction of the diode 38 and 44 and ground. This output voltage is indicated at waveform (*e*) of FIG. 3 and it is the full limited voltage extending from $+V_4$ to $-V_4$. The other channel which sets the limits of the frequency range of the system output derives its output voltage across the side of the bridge defined by the diode 40. This output voltage is indicated in waveform (*f*) of FIG. 3. Note that the negative swing of this voltage is effectively at ground (the difference being only the drop across the diode 40). The positive swing extends to $+V_5$ which is almost equal to $+V_4$, the difference being only the voltage drop across the diode 44. The use of only one of the bridge diodes affords temperature compensation for the diodes 68 in the peak detector 24.

The channel which provides control of the slope of the control characteristics over the frequency range includes a control element 28. A similar control element 26 is included in the limit control channel. These elements include isolation transformers 50 and 52. Potentiometers 54 and 56 are connected across the secondary windings of these transformers 50 and 52. The resistance presented by these potentiometers is reflected into the secondary windings of these transformers 50 and 52, which are connected in series in their respective channels. Thus, adjustment of the potentiometers 54 and 56 affords an external vernier slope control, in the case of the element 28 and a limit adjustment in the case of the element 26. It will be noted that the potentiometers 54 and 56 are connected to an external ground which is indicated as being an earth ground. The transformers 50 and 52 provide isolation between earth ground and any external circuits connected thereto and the system.

The lowpass filter 18, by removing high frequency components of the oscillator output from the feedback channels avoids any ringing due to such high frequency components in the transformers 50 and 52 which could adversely affect the operation of the discriminator 30 and peak detector 24 in the feedback channels.

A diode peak detector 24 and discriminator 30 are connected in the limit control and slope channels, respectively. Internal adjustments of signal amplitude are provided by the potentiometers 58 and 60 contained in the respective detectors 24 and 30. These detectors develop control signals of opposite polarity and use capacitors 62 and 64.

The detector 24 is a peak detector and includes a diode 68 polarized to pass and store in capacitor 62 the positive peaks of the waveform (waveform (*f*) of FIG. 3) which is applied thereto. The detector 30 includes a pair of diodes; a series diode 70 and a shunt diode 72 which function together with a series capacitor 74 and the output capacitor 64 as a frequency discriminator. The diode 70 is polarized oppositely from the diode 68 with respect to the current paths through them in the channels to the amplifier 15. The current developed in the detectors 24 and 30 flow to the direct input of the operational amplifier 15 and there summed and combined with a current derived from the input control current through resistors 43 and 45.

The peak detector 24 develops a current of sufficient amplitude to preset the limits of the output frequency from the system. Inasmuch as the voltage applied to the peak detector is regulated it is constant regardless of oscillator frequency. With zero input current the peak detector current equals the current developed by the discriminator 30 when the oscillator is producing output signals at $F_1$. With the potentiometers 54 and 56 in the middle of their range, the potentiometers 58 and 60 in the peak detector 24 and discriminator 30 are adjusted to calibrate the operating characteristic and set the limit of the range at $F_1$ and $F_2$ with input currents of zero and $I_1$.

This calibration operation overcomes the inherent variations in the variable frequency oscillator 16 due to particular component characteristics , aging, temperature effects, and other environmental effects and the like. It will be noted that the feedback arrangement including the pair of channels provides control of the slope and upper and lower limits of the frequency range. Between the limits of the range, the feedback then ensures linearity of operation. The characteristics of the system illustrates the saturation effect for input currents greater than $I_1$. This saturation effect is due to control amplifier 15 saturation.

The operating supply for the system is indicated as coming from a direct current source 80, the negative terminal of which is connected to earth ground. Isolation of this source and earth ground from the system is an important feature of the invention. To this end the voltage produced by the source 80 is regulated in a direct current voltage regulator circuit 32. This circuit is of conventional design and includes a series regulator transistor 82 and a control transistor 84 which compares a reference voltage applied to its base with the source voltage applied across its emitter base circuit by way of resistor 86. The reference voltage is obtained from a zener diode 88 connected between the base and the positive side of the regulator output. A smoothing capacitor 90 is connected across the regulator output.

The regulated direct current voltage is then converted into an alternating current voltage by a DC to Ac converter circuit 34. This circuit includes an isolation transformer 92, the primary winding of which is part of the switching circuit of a multivibrator 94 which is the active element of the inverter 34. The AC to DC converter 36, is a bridge rectifier 96 having filter capacitors 98 and 100 each connected to a different end of the output diagonal of the bridge 96. The operating voltages indicated +B and −B are provided at these bridge diagonals ends. Inasmuch as the capacitors 98 and 100 are connected to system ground and since the bridge is connected across the secondary of the transformer 92, the center tap of which is connected to said system grounds, the converter 36 provides operating potentials at +B and −B completely isolated from the source 80 and from the external ground.

From the foregoing description it will be apparent that there has been provided an improved system for converting a direct current input into an output frequency, the output frequency being provided by an oscillator in the system. Isolation from external sources and even from externally grounded control devices is provided in accordance with the invention. The herein described system is of course presented for purposes of illustrating the invention. Variations and modifications in the system, within the scope of the invention will undoubtedly suggest themselves to those skilled in the art. Accordingly, the foregoing description should be taken merely as illustrative and not in any limiting sense.

What is claimed is:

1. A system for providing an output signal having a frequency related to the amplitude of an input signal, which system comprises
   a. a variable frequency oscillator for providing said output signal,
   b. means responsive to said input signal amplitude for applying a control signal to said oscillator to vary the frequency of said oscillator in accordance with the amplitude of said control signal,
   c. means responsive to the signal produced by said oscillator having first and second alternating current channels respectively for developing first and second signals of opposite polarity, said first signal varying in amplitude in accordance with the frequency of said oscillator signal and said second signal being of certain amplitude regardless of variations in oscillator frequency, said last named means including means for limiting the level of said signal produced by said oscillator to provide as inputs to at least said second channel a signal which does not exceed a predetermined amplitude, and
   d. means for applying said first and second signals to said control signal applying means.

2. The invention as set forth in claim 1 wherein said limiting means includes a bridge rectifier at the input ends thereof, one of said pair of channels being connected across a diagonal of said bridge and the other of said pair of channels being connected across one side of said bridge.

3. The invention as set forth in claim 2 wherein a zener diode is connected across a diagonal of said bridge and one end of which is connected with the end of said one side of said bridge across which the input of said other of said pair of channels is connected.

4. The invention as set forth in claim 3 including a frequency discriminator and a peak detector respectively connected in said first and said second channels.

5. The invention as set forth in claim 1 including means for isolating said system from a source of direct current operating potential therefor, said isolating means including means connected to said source for converting said operating potential into alternating current, a transformer having a primary winding connected to said converting means and a secondary winding isolated therefrom, and means connected to said secondary winding for converting said alternating current into direct current operating potential for said system.

6. The invention as set forth in claim 5 including between said limiting means and the input to at least one of said channels a potentiometer, a transformer having a primary winding connected in series between said limiting means and said one channel input and a secondary winding across which said potentiometer is connected, said transformer providing isolation between said potentiometer and said one channel.

7. The invention as set forth in claim 5 wherein said system has an internal ground and wherein said potentiometer, said source and said direct current to alternating current converting means has a common external ground.

8. The invention as set forth in claim 1 wherein said oscillator is a voltage controlled oscillator, said control signal applying means comprises an amplifier having an input for said input signal and said first and second signals, and wherein said system has an internal ground and an external ground, a power supply including a DC to AC converter connected to said external ground and an AC to DC converter connected to said internal ground, said DC TO AC converter having an AC output and said AC to DC converter having an AC input, said AC output and AC input being transformer coupled to each other, and wherein a first and a second transformer each having a separate potentiometer connected across one of the windings thereof, said one winding being connected to said external ground, said first and second transformer each having a second winding respectively connected in series between said limiting means and said first and said second channel, and wherein said first channel includes a peak detector, said second channel includes a discriminator circuit connected to said limiter, and wherein the output of said peak detector and said discriminator are connected to said input of said amplifiers.

9. The invention as set forth in claim 8 including a low pass filter connected between said limiting means and said oscillator.

10. The invention as set forth in claim 8 wherein said peak detector and said discriminator each including a separate capacitor across which their respective channel outputs are developed, said peak detector and said discriminator also separately including diodes, connected to their respective capacitors with opposite polarizations whereby said channel outputs have opposite polarities, said discriminator including an input capacitor and a pair of diodes connected in series across the first channel output capacitor, said input capacitor being connected in series with one of said second windings to the junction of said pair of diodes.

* * * * *